May 30, 1939. A. H. DALL ET AL 2,160,777

JOURNAL BEARING

Original Filed June 14, 1933 3 Sheets-Sheet 1

Inventor
ALBERT H. DALL
HANS ERNST

A H Parsons
Attorney

Patented May 30, 1939

2,160,777

UNITED STATES PATENT OFFICE 2,160,777

JOURNAL BEARING

Albert H. Dall and Hans Ernst, Cincinnati, Ohio, assignors to Cincinnati Grinders Incorporated, Cincinnati, Ohio, a corporation of Ohio Application June 14, 1933, Serial No. 675,792
Renewed July 16, 1936

10 Claims.  (Cl. 308—73)

This invention relates to improvements in journal bearings of the class in which the bearing surfaces consist of a plurality of bearing elements of the type known as Michell bearings for example.

The principal object of this invention is, therefore, the provision of an improved bearing of the above indicated type, having particular application to rotating shafts and spindles of machine tools, such as the spindle of a grinding machine.

Another object of the invention is the provision of a bearing which will maintain the axis of the shaft or spindle in definite relation with respect to the supporting housing, and in the case of a grinding machine, in definite relation to the work, by eliminating any jiggling of the shaft or spindle and insuring the accurate production of work pieces.

A further object of this invention is the provision of an improved spindle bearing which will automatically adjust itself to various loads placed on the spindle, and thereby maintain the spindle axis in substantially the same position regardless of the said variations in load.

It is also an object of this invention to provide an improved bearing of the type above referred to in which the preload on the bearing shoes may be accurately adjusted to insure the accurate control of the axis of rotation of the spindle or shaft.

A further object of the invention is the provision of an improved bearing of the type above referred to in which the bearing shoes are at all times supplied with the proper and necessary amount of lubricant to insure the accurate functioning of the said bearings when utilized with precision devices.

A still further object of this invention is the provision of a bearing of the above general nature for use with rotating shafts and spindles in which there is at all times maintained an adequate oil film between the bearing and shaft or spindle thereby preventing a seizing of said rotating part by the bearings.

Further and detailed objects of the invention is the provision of an improved bearing of the above indicated type for particular use with machine tool spindles in which the segmental shoes are prevented from fluctuating due to an irregular amount of fluid or lubricant, thereby insuring a stable position for the journal axis; the provision of a bearing of the above general nature in which foreign and extraneous matter is eliminated and prevented from entering; such a bearing in which the accumulation of heat generated by friction is held to an absolute minimum and thus the bearing is prevented from seizing; and such a bearing in which an adequate oil film is at all times maintained between the bearing and journal.

Further objects and advantages of the present invention should be readily apparent by reference to the following specification, considered in conjunction with the accompanying drawings forming a part thereof, and it is to be understood that any modifications may be made in the exact structural details therein shown and described without departing from or exceeding the spirit of the invention.

In the drawings.

Throughout the several views of the drawings similar reference characteristics are employed to denote same or similar parts.

In the past, "Michel" type of bearings have been employed for certain classes and types of supports, but were never designed or utilized for supporting spindles and rotating shafts of precision types of machine tools. The former "Michel" type of bearing was provided with no means for effecting a preload thereon and was not suitable to insure the rotation of the supported member about an unvarying axis, but permitted the said axis to shift with every slight variation in oil supply or with change of load. The said bearings were not supplied with the proper quantity of operating fluid or lubricant to insure their operation as precision bearings and were therefore incapable of use with precision machine tools, for example.

By this invention the drawbacks to the prior art segmental shoe type of bearing have been overcome so that they can be utilized with safety in precision machine tools for the production of accurate work pieces. This type of bearing, while not restricted to precision machine tool structures, will probably find its most useful application in connection with the spindles of precision grinding machines. The invention is therefore illustrated as employed on a grinding machine of the centerless type.

Specifically, the machine illustrated in the drawings comprises a bed 10, having rising therefrom a pedestal bearing housing 11 in which is disposed a spindle 12. The spindle 12 has secured to its tapered nose 13 a wheel collet 14 to which is fastened a grinding wheel 15. The wheel 15 is enclosed within a hood or guard 16 secured in any desirable manner to the bearing housing 11. Projecting from the rear of the hood or guard 16 is a shelf 17 supporting a truing mechanism 18 for traverse movement relative to the face of the wheel 15.

The bed 10 on its upper surface, and extending from the bearing housing 11, is provided with a guide 19 received in a suitable guideway formed in the undersurface of a slide 20. The slide 20 in turn provides a guide 21 for an upper slide or housing 22. Secured to the upper slide or housing 22 is a head 23 in which is journaled a spindle for a wheel 24.

The wheel 24 is known as a regulated wheel and is peripherally opposed to the grinding wheel 15 to form a grinding throat in which is disposed the work 25. The grinding wheel and the regulating wheel are each rotated in a clockwise direction whereby their proximate portions travel in opposite directions with respect to the work. The grinding wheel is rotated at a high grinding rate of speed, while the regulating wheel is rotated at a relatively slow work rotation controlling rate of speed. Any suitable means may be provided or employed for effecting the said rotation of the wheels.

The work 25 is peripherally supported on the inclined supporting face 26 of a work rest blade 27. The blade 27 is carried by a work rest block 28, in turn secured to the inner end of the lower slide 20 and immediately beneath the grinding throat.

In order to adjust or vary the size of the grinding throat the upper slide or housing 22 has mounted therein a nut 29 in threaded engagement with an adjusting screw 30. The screw 30 is rotatably journaled in a bracket 31 extending upwardly from the bed 10 and the said screw projects beyond this bracket to receive a pilot or hand wheel 32 whereby the screw is rotated.

The foregoing description deals with a centerless grinder as commercially produced, and it is in this type of machine that the improved spindle bearings of this application may be employed, as well as with all other types of grinding machines and other machines and machine tools.

The support of the grinding wheel spindle is illustrated in detail but it should be noted that the regulating wheel spindle may be mounted in the same manner as the grinding wheel spindle which is not to be described. The bearing housing 11 provides the bearing portions 33 and 34 through which relatively large bores are formed for respectively encircling journal portions 35 and 36 of the spindle 12. Intermediate the journals 35 and 36 the spindle has keyed to it a sheave or pulley 37, here shown as of the multiple groove type, for the multiple V belts 38. This mechanism provides the drive for the spindle and grinding wheel. One end of the bearing portion 33 is closed by a thrust bearing container 39, which contains an anti-friction thrust bearing 40 secured to the reduced rear end 41 of the spindle. An oiltight and airtight joint is formed between the thrust bearing container 39 and the end of the housing bearing portion 33. By this construction the major portion of foreign materials is kept out of the bearing from this end.

The bearing portions 33 and 34 are each provided therein with a fluid or lubricant chamber which is respectively formed between rings 42 and 43 and rings 44 and 45. The rings 42, 43, 44 and 45 are each provided therein with a bore only slightly larger than the diameter of the journals which they encircle, thereby providing restricted orifices between themselves and the journals. These orifices are in the nature of a couple of thousandths of an inch or so, thereby permitting a continuous but very restricted flow from their chambers. These rings, however, while permitting this continuous flow, will maintain the chamber filled with lubricant under pressure as will later be made clear.

Figures 4, 7, 8:
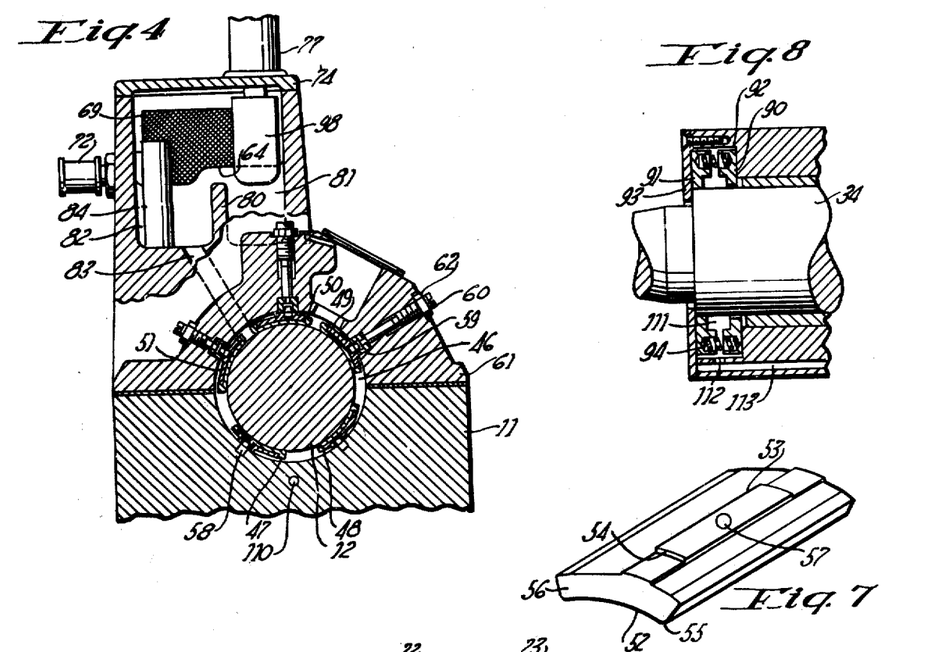
Figure 4 is a sectional view taken on line 4—4 of Figure 2.
Figure 7 is a perspective view of a modified form of bearing shoe.
Figure 8 is a view of a modification of the oil or lubricant retaining means forming a detail of the invention.
Figure 5:
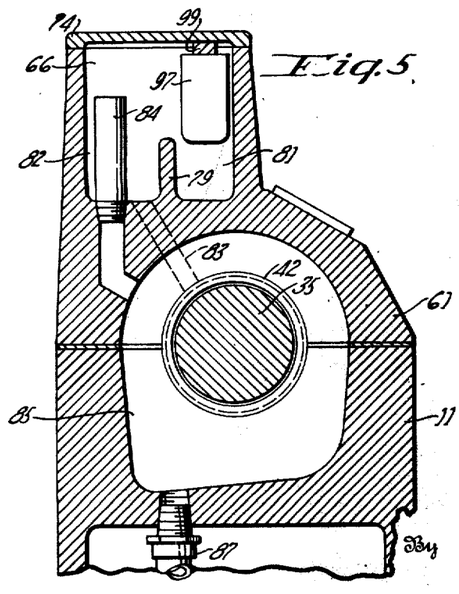
Figure 5 is a sectional view taken on line 5—5 of Figure 2.
Figure 6:
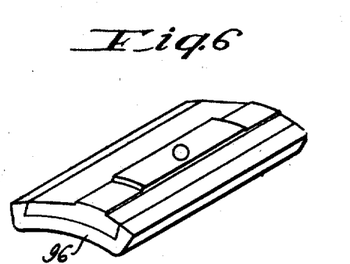
Figure 6 is a perspective view of one of the bearing shoes forming a detail of the invention.
Figure 9:
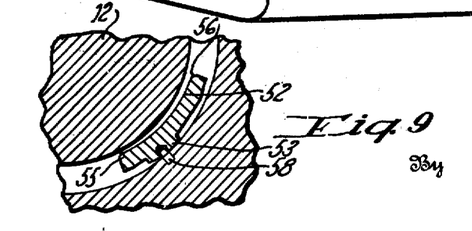
Figure 9 is an enlarged, exaggerated view, illustrating the action of the bearing.

Since each of these chambers perform the same function and each contains the same elements it is deemed sufficient if but one of them be described in detail. Accordingly the chamber, within the bearing portion 34 and designated by the reference character 46, illustrated in cross section in Figure 4, contains a plurality of segmental shoes 47, 48, 49, 50 and 51. The shoes 47 and 48 are disposed below the horizontal plane, passing through the axis of the spindle while the shoes 49, 50 and 51 are disposed above this plane. Each of these shoes are identical and may be of the form illustrated either in Figure 6 or Figure 7. As there shown, each shoe comprises an arcuate face 52 which is opposed to the spindle journal and of a radius equal to or slightly greater than the radius of the spindle journal, and it will be noted that this arc is of a relatively short length. The shoes, as a whole, are of a length somewhat less than the length of the chamber 46, so as to provide a space between the ends of the shoes and chamber forming rings to afford communication between the spaces between successive shoes. Extending along the back of each shoe may be a rib 53 extending for a considerable length of the shoe but not necessarily throughout the entire length thereof. The upper portion of the rib 53 is provided with an arcuate bearing face 54 of a radius somewhat less than that of the bore of the housing bearing portion as shown in an exaggerated form in Figure 9. Since the chamber 46 is formed concentric with the axis of the spindle journal enclosed thereby, the ribs 53 will contact with the wall of the bore of the chamber along a line extending substantially parallel with the axis thereof. It will be noted that the rib 53 is not formed centrally with respect to the arc 52 but is disposed nearer one edge thereof. Since the spindle is rotating in a clockwise direction, as seen in Figure 4, the rib would be positioned nearer the trailing edge 55 of the bearing shoe than the leading edge 56 thereof. The purpose of this construction is well understood but will be explained in some detail later.

In order to retain the shoes in position and to prevent them moving with the spindle, each is provided in the rib thereof with a socket 57 receiving the tapered nose of pins 58, mounted directly in the pedestal bearing so far as the shoes 47 and 48 are concerned, and in pressure blocks 59, so far as shoes 49, 50 and 51 are concerned. In order to provide the proper or desired preload on the bearings the shoes 49, 50 and 51 are mounted for radial adjustment toward and from the axis of the spindle and have, therefore, contacting therewith substantially throughout the length of the ribs 53 the clamping shoes or pressure blocks 59. Each of the clamping shoes is secured to clamping screws 60 for movement therewith. These screws 60 are threaded into the pedestal bearing, or rather in the bearing cap 61 and a lock nut 62 is provided for each screw to lock same in adjustment position. It is to be understood that the means for radial adjustment of the shoes toward and away from the spindle is primarily useful in securing the desired substantial preload which is referred to at various points herein. The preloading feature is dealt with in applicants' co-pending application Serial No. 83,018, filed June 2, 1936, for "Bearing". This radial adjustment of the shoes as a feature of construction, nevertheless, would be of value in securing exactly the desired position of these parts even if they were not set so as to achieve any appreciable preloading under idling conditions of the machine.

From the foregoing it will be noted that the spindle journals are surrounded by a plurality of segmental bearing shoes of relatively short arc contact. It will further be noted that the preload of these bearing shoes may be adjusted in accordance with the requirements of the particular application. It will also be noted that they are substantially enclosed within a chamber which is at all times maintained filled with operating fluid or lubricant, preferably oil under pressure.

The pedestal bearing 11 has rising there-above a hollow portion 63 forming a lubricant well and providing a head or pressure for the lubricant. As shown in the drawings, the well 63 is divided transversely by ribs 64 and 65, forming transverse compartments 66, 67 and 68.

Disposed in the central compartment 67 is a large open top screen box 69 which is secured to the rear wall of said compartment by means of elbows 70 and 71. The elbows are in turn connected by nipples which extend through the said rear wall of the compartment 67 for connection with couplings 72 and 73, forming part of a lubricating circulating system. In other words, the couplings 72 and 73 are connected to suitable conduits which extend from the circulating pump, which may be of any well-known or standard make and therefore is not disclosed in the drawings. The only consideration, so far as the pump is concerned, that is necessary, is that it be of a type which will pump as little air as possible with the fluid that it circulates.

The circulating system supplies the fluid or lubricant through the elbows 70 and 71 in such quantities to maintain the well filled at all times and to maintain the lubricant in the journal chambers filled and under a constant pressure. The lubricant upon passing through the screen box 69 has the air bubbles therein broken by the mesh of the screen so that substantially homogeneous fluid or lubricant, that is fluid free of air, enters the central compartment 67.

The hollow portion or well 63 is closed on top by a cover plate 74 thereby forming a completely enclosed well to exclude foreign matter therefrom. Carried by said cover plate 74 is a guide bushing 75, for a purpose to be later described, which has formed there through air vents 76 communicating with a guide sleeve 77 through which additional air vents 78 are provided. These air vents 76 and 78 permit the escape of the air from the well that is released or removed from the operating fluid or lubricant by the screen box.

The two end compartments 66 and 68 of the lubricant well are in turn respectively laterally divided by walls 79 and 80, the compartment 68 being shown in detail in Figure 4. From this view it will be noted that the said compartments 66 and 68 are divided into pockets 81 and 82. As the lubricant builds up in the central compartment 67 it overflows the walls 64 and 65 into the end compartments 66 and 68 filling the pockets 81 and 82 therein. The pocket 81 has no outlet whatsoever so therefore any lubrica. therein is trapped against displacement except as will be later described. The rear pocket 82, however, has an outlet through the inclined port 83 whereby the lubricant from the pocket 82 of the compartment 68 flows to the chamber 46 in the bearing portion 34, while the lubricant from the pocket 82 in the compartment 66 flows through a similar part 83 to the chamber in the bearing portion 33. The pockets 82 have an additional outlet or overflow which comprises an upstanding pipe 84 rising to a height considerably above the walls 64, 65, 79 and 80, and since the lubricant enters the well at a rate considerably in excess to that whereby it is supplied through the ports 83, as permitted by the orifices of the chamber forming rings, the level of the lubricant reaches the top of the overflow pipes 84, thereby maintaining the well at all times with a considerable quantity of lubricant and furnishing a head therefor.

It should now be clear that when the machine is in operation the bearing shoes are at all times submerged in lubricant and at the same time this lubricant is maintained under a definite head or pressure, as determined by the height of the overflow pipes 84, which tends to force the lubricant through the orifices formed by the lubricant retaining rings, thereby at all times maintaining a flow or circulation of the lubricant through the chambers, thereby constantly carrying away the heat generated and keeping the bearings cool.

Adjacent the inner ends of the bearing portions 33 and 34 the pedestal is provided with cored recesses 85 and 86 which receive through the orifices formed by the rings 42 and 45, the operating fluid or lubricant from the chambers within the bearing portions. Adjacent respectively to each of the chamber forming rings 43 and 44 are recesses 105 and 106 which receive the operating fluid or lubricant from their respective chambers through said rings. The recess 105 is drained through ports 107 and 108 to the cored recess 85 while the recess 106 is drained through ports 109 and 110 to the cored recess 86. Also connected respectively with the cored recesses 85 and 86 is one end of pipes 87 and 88 which terminate in the operating fluid or lubricant sump for returning said fluid for recirculation through the system. Communicating with the passages 85 and 86 is also the overflow pipes 84 so that as soon as the well is filled, the excess is immediately returned to the sump.

The operation of a segmental or rocking shoe bearing of the above described type is well understood but a brief résumé thereof it is believed would be helpful. Therefore, referring to Figure 9 and assuming the spindle to be rotating in a clockwise direction and that the space between the leading edge of the bearing shoe and the spindle is provided with operating fluid or lubricant, the operation is as follows:

When the spindle begins to rotate, the lubricating medium is drawn into the lead-in or is already present at the lead-in to the bearing. By reason of the adhesiveness of the oil to the shaft, the surface layer of molecules of the oil adjacent to the shaft is drawn in between the surfaces. Since the oil or lubricating medium has intermolecular friction or what is commonly called viscosity, other molecules of oil are drawn into the bearing space. This causes the journal to lift away from the bearing and in so doing provides more room for oil to enter. After the lubricating medium has entered between the surfaces, the surface layer of molecules adjacent to the spindle is moving with the spindle, while the surface layer adjacent to the bearing is stationary with it. It is obvious therefore, that all the lubricating medium between these surface layers is in a continual state of slip or what is known as shear. When these surfaces are relatively close to each other, the shear forces in the oil are very great, and since the stress in a liquid must be the same in all directions, a pressure is built up normal to the surfaces.

The hydrodynamic theory of fluid films shows that, in order to support a load, the pressure change in the film must be gradual. The theory also proves that to obtain a gradual change the film must be wedge-shaped with its thickness diminishing in the direction of motion. Equilibrium is reached when the integration of all the pressure elements in the film is equal to the external load on the spindle. This condition of equilibrium will obtain as long as a copious supply of lubricating medium is present at the lead-in edge of the shoe. This theory also shows that for optimum conditions the center of pressures occurs nearer to the trailing edge than to the leading edge of the bearing shoe. Therefore, in this invention the rocking shoes are shown with the supporting surface nearer to the trailing edge.

Since in the present invention the chambers containing the journals and the shoes are at all times filled with lubricant there will be sufficient lubricant at the said leading edge. Each of the shoes correspondingly sets up a radial pressure, thereby exerting a pressure at spaced points around the spindle and centralizing the axis of rotation of the spindle with respect to the shoes. In the event that the spindle is rotated at a higher or lower rate of speed the pumping action relative to the shoes will be correspondingly varied, thereby correspondingly varying the pressure at all of the shoes but still maintaining the center or axis of the spindle as previously established.

In the past, an insufficient quantity of the operating fluid or lubricant was supplied to the shoes, resulting in occasional air gaps at one or more of the shoes, causing the pressure at these particular shoes to be varied from moment to moment. This resulted in rapid shifting of the spindle to a new position of equilibrium. It is, therefore, believed evident that by this invention the axis of rotation of the shaft or spindle is maintained at a substantially definite position and in definite relation to a work piece being operated upon, which was not the case with prior art structures. When non-rocking segments were used it was necessary for the spindle to shift position to accommodate increments or decrements in load. It is obvious that when the spindle shifted to establish the proper wedge it would change the wedge on some other shoe, thus violating the wedge principle.

In the rocking shoe principle, each wedge is established independently of the other wedge, thus accommodating loads in any direction.

Figure 1:
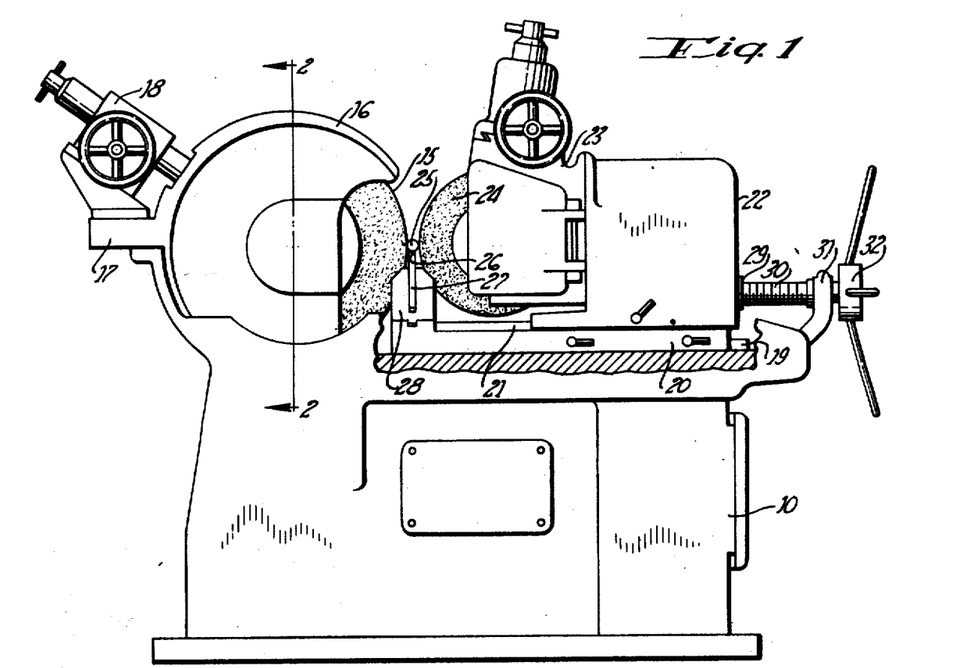
Figure 1 is a front elevation of a machine tool embodying the improvements of this invention.
Figure 2:
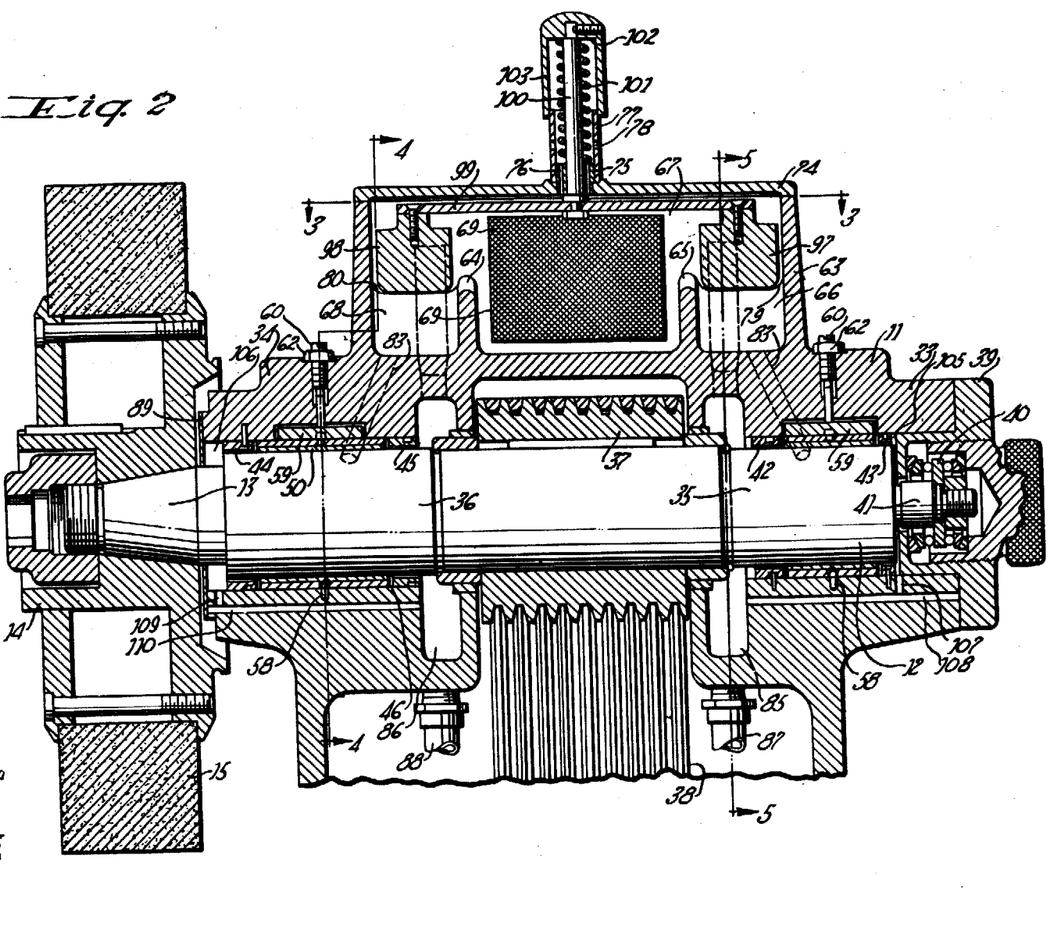
Figure 2 is a sectional view taken on line 2—2 of Figure 1 through the grinding wheel spindle.
Figure 3:
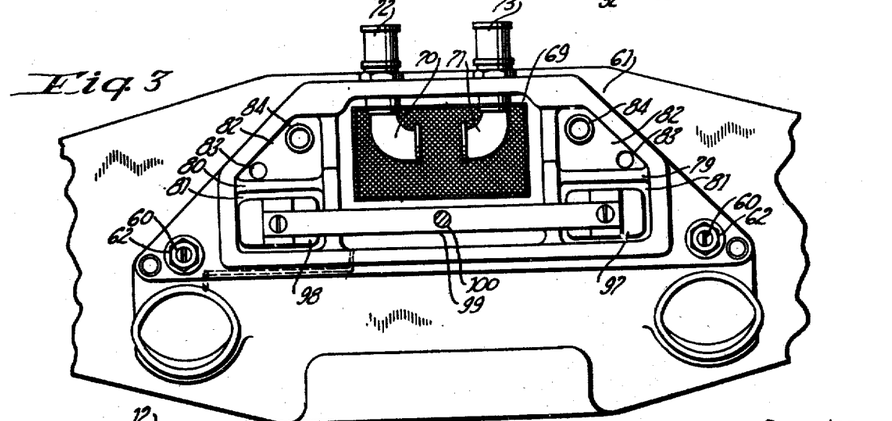
Figure 3 is a plan view as seen from line 3—3 on Figure 2.

As was pointed out above, with grinding machines, for example, coolant is employed with the grinding wheel and in the past the coolant frequently entered the bearing, particularly from the front end thereof, carrying with it foreign matter such as dust, dirt and chips removed from the work by the wheel. These foreign particles embedded themselves in the bearing or journal, resulting in the destruction of one or the other or both. Guard plates or rings, such as 89 in Figure 2, were supplied in an endeavor to keep out the said coolant and the like but these rings or plates cannot be made sufficiently close to the spindle to actually prevent the passage of coolant and foreign particles. In the present construction the ring 89 very closely approaches and encircles the spindle so that very little flow is had between the same and the spindle. However, there may be a slight in-flow of coolant therethrough, which would be caught by the recess 106 and prevented from entering the lubricant chamber by the continuous outflow of lubricant through the orifice formed by the ring 44. Since this recess 106 is continually drained, as above described, the said impurities will be carried with the operating fluid or lubricant to the sump where it passes through a filter and the removal of said impurities effected. It is, therefore, believed that it is now clear that there has been provided a bearing from which foreign matter is definitely excluded.

A modified form of lubricant retaining ring is shown in Figure 8 and comprises a pair of circular rings 90 and 91 mounted within a counterbore 92 in the end of the bearing portion 34; the diameter of the counterbore is somewhat larger than the diameter of the rings whereby the rings are free to float within the said counterbore. The ring 90 abuts the base of the counterbore, while the ring 91 abuts the opposed face of a retaining member of ring 93 secured to the end of the bearing portion. A plurality of expansion springs 94 are mounted in opposed sockets formed in the ring members 90 and 91 and yieldingly actuating the said members in opposite directions against their abutting surfaces. The ring 90 is provided with a bore slightly larger than the diameter of the journal, which it encircles, and controls the flow of the operating medium from the chamber while the ring 91 is provided with a bore that is a standard running fit on the journal and prevents any appreciable flow there-through.

By this construction, minor inaccuracies in manufacture may be compensated for, that is, should the bore of the lubricant chamber be slightly eccentric with respect to the spindle axis, the shifting of the spindle will carry with it, through the ring 91, the two rings 90 and 91, thereby maintaining the orifice of the ring 90 at all times around the spindle and not only on one side thereof. Also, in the event of wear on certain of the parts which might result in shifting of the spindle, would correspondingly shift the chamber forming rings 90 and 91 therewith.

The rings 90 and 91 form between them a recess 111 which received the fluid from the chamber and this recess is drained by means of ports 112 and 113 which empty into the cored recesses as above described.

Recent lubrication research has shown that the determining factor in the performance of a lubricated bearing is the affinity between the material comprising the bearing surface and the particular lubricant used. The phenomena of frictional resistance has been shown to be electrical in nature, the opposition to movement being due to interference between the fields of force of the molecules adjacent to the surfaces of the relatively moving objects. From this it follows that the most perfect bearing material is one in which the arrangement of the unbalanced molecular forces at the surface most nearly approaches to that which exists at the surface of a liquid.

In the well known hydrodynamical theory of film lubrication, the assumption is made that no slip occurs between the outer surfaces of the film and the adjacent surfaces of journal and bearing. If slip does occur, the shear forces in the film, which are directly related to the normal pressures supporting the load, have reached their maximum value. Thus the bearing reaches its load carrying capacity when this slip occurs. It has been established that the slipping point is a function of the character of the finish of the part in contact with the oil film. It is also an established fact that journals can be more readily finished with greater accuracy and better surface finish than the internal surface of a bearing. Even when scraped, the bearing surfaces are not comparable to the accurate and highly finished journals, now used in commercial operation. For this reason, slip generally occurs at the surface of the bearing before it occurs on the journal.

The underlying reason for the greater adherence of the journal to the oil film can be explained in the following way by the modern theory of surface phenomena. At the surface of any liquid or solid an electrical field exists on account of the lack of symmetry of the external electrical field of each molecule. When a surface is smooth, this field is in general normal to the surface. Thus in the case of a film on a smooth journal, the boundary, or surface of the film is a cylindrical shell of lubricant which adheres more or less tenaciously to the journal, depending on the types of materials which are used for both journal and lubricant. On the other hand, a surface which is pitted or scratched, will cause the surface layer of lubricant to present an uneven surface which is not parallel to the direction of motion. Thus the shear forces set up in such a film will vary from point to point because the shear set up in a liquid is a function of the distance from the surface which is reacting against the liquid. At the high points the shearing forces in the film are great and slip may occur thus breaking thru the film.

Up to the present time metallic journals, chiefly steel, have been satisfactory. However, the bearings have been deficient in their performance. This deficiency in performance is traceable to two causes. The first is the lack of accuracy of the bearing surface as previously pointed out, while the second is the result of improper attempts to eliminate the first cause. With bearing surfaces such as commonly used in commercial operation, the breakdown of the oil film is so frequent that attempts have been made to offset this breakdown by choosing a bearing material which has a relatively low co-efficient of friction when operated with a dry journal. It has been proven that when two materials of strong surface electrical fields are brought into dry contact with each other they will exhibit a high frictional resistance on account of the interference of like fields. This is in addition to any geometric interference of the surfaces. Thus, to provide a low frictional resistance, the bearing materials commonly selected have relatively weak surface fields, but they thus also have a relatively low attraction for the surface layer of oil molecules. In this way the likelihood of film breakdown is actually increased merely to improve the condition after breakdown.

It has been found by experiment that a material which overcomes the above noted difficulties to a very high degree is phenolic-resinoid which can readily be combined with various fillers or binders, such as paper or cloth, to make a readily useable article. The use of this type of bearing, however, is limited by the fact that it cannot be readily molded under high pressure to a sleeve form having a smooth inner surface with a high luster. By the particular arrangement of the bearing surfaces used in this invention molded phenolic resinoid bearing surface makes a very satisfactory arrangement. The molded bearing surface can be made with a very high degree of accuracy and the smoothness of the surface is exactly that of the mold. In addition to providing a perfect bearing surface we have found that a molded phenolic-resinoid surface has a very strong attraction for oil. Oil clings so tenaciously to the surface that in some cases a solvent must be used to remove it.

Thus it is seen that molded phenolic-resinoid when used in conjunction with an accurate and highly finished journal is very favorable to film lubrication. Boundary slip will not occur until very high loads are experienced. Thus, a machine tool spindle of the above described type can be made very stable by applying high preloads without danger of film breakdown.

In view, however, of the fact that it is frequently desirable to preload or apply pressure to the bearing shoes, as for example by the screws 60, it was necessary to back up the said shoes with a stiff material. Resort was therefore had to the structure illustrated in Figure 6 wherein a steel or hard metallic insert was employed on which was placed laminations of the phenolic-resinoid material 96 whereupon the entire assembly was subjected to a high pressure, thereby forming a bearing shoe having an arcuate bearing face, such as 52, of a radius substantially equal to that of the journal with which it is to be used, which had a high luster and was extremely smooth. Its high affinity for the lubricant insured a film of lubricant at all times between the bearing and journal, thereby effectively preventing any true contact between the journal and shoes. At the same time, by utilizing the rocking shoe with the phenolic-resinoid facing, the advantages of both bearing and bearing material were obtained in a single structure.

As will be appreciated from the drawings, when the machine is shut down the lubricant circulating system is likewise interrupted. At this time the lubricant within the well will be drained by gravity from the rear pockets 82 to the bearing chambers through which it flows under the pressure of the head to the return conduit and sump. From this it will be seen that after a shutdown of a period of time, such as overnight, all lubricant may be drained from the bearings with the exception of course of that film which adheres to the resinoid face of the bearing shoes. Therefore, when again starting up the machine, as the next morning for example, the bearings and journals will be substantially devoid of lubricant and it has been found that it is at the time that the machine is started or when the spindle is initially rotated that the greatest damage to spindle and bearings occur because of the lack of lubricant. However, due to the fact that the pockets 81 are completely closed, that is, have no outlets whatsoever, the said pockets will be substantially filled with lubricant even though the remaining part of the well has been drained. Since this lubricant is in close proximity to the bearing it can be utilized for supplying lubricant to the bearing until the main circulating system is in operation.

Accordingly, there has been provided a pair of lubricant displacing members 97 and 98, one for each of the pockets 81 in the compartments 66 and 68. These displacement members are secured to opposite ends of a bar 99 carried by a plunger 100. The plunger 100 passes through the guide bushing 75 carried by the well covered plate 74. Surrounding the plunger 100 is a spring 101 abutting on one end with the guide bushing 75 and on the other end with a knob 102 secured to the plunger 100. Depending from the knob 102 is a sleevelike skirt 103 that surrounds and co-operates with the guide sleeve 77 for guiding the plunger in its movements.

The spring 101 normally exerts an upward movement, thereby holding the displacement members 97 and 98 above the pockets 100 so that during the normal operation of the machine the said pockets may be filled with lubricant. Prior, however, to operating the machine the operator merely manually engages the knob 102 and depresses same against the resistance of the spring 101, thereby forcing the displacing members 97 and 98 into the pockets 81 and discharging the lubricant therefrom. This lubricant then flows into the pockets 82 from which it flows through the ports 83 to the bearing chambers. In view of the fact that the flow from these chambers is materially restricted by the lubricant retaining rings, the lubricant will be substantially retained in the chambers until the normal lubrication, circulating system is in operation for immediately filling the lubricant well and supplying the head to the lubricant within the chamber. The time interval between the starting of the machine and the supplying of lubricant by the lubricant circulating system is merely a matter of seconds, so that the bearing with the mechanism disclosed by applicant is at all times supplied with sufficient lubricant.

What is claimed is:

1. In a machine tool organization the combination of a bearing housing, a rotating member within said housing, a plurality of bearing shoes carried by the housing and circumferentially spaced around the member, means carried by the housing whereby a fluid chamber is formed to maintain the bearing shoes at all times submerged, means for supplying fluid under pressure to the chamber, means for effecting a throttled flow of the fluid from the chamber into a space which is free from pressure above atmosphere, said means for supplying fluid under pressure comprising a well associated with the housing above the chamber whereby a head is provided for the fluid, and means for supplying fluid to the well.

2. In a machine tool organization the combination of a bearing housing, a rotating member within said housing, a plurality of bearing shoes carried by the housing and circumferentially spaced around the member, means carried by the housing whereby a fluid chamber is formed to maintain the bearing shoes at all times submerged, means for supplying fluid under pressure to the chamber, means for effecting a throttled flow of the fluid from the chamber into a space which is free from pressure above atmosphere, said means for supplying fluid under pressure comprising a well associated with the housing above the chamber whereby a head is provided for the fluid, means for supplying fluid to the well, and overflow means associated with the well to maintain a sufficient stage therein and determine the pressure head on the lubricant as supplied to the chamber.

3. In a grinding machine the combination of a housing, a bearing portion formed in said housing, a spindle extending through the housing having its journal surrounded by the bearing portion a plurality of segmental bearing shoes within the housing bearing portion and surrounding the spindle journal, lubricant chamber forming rings within the bearing portion and forming a lubricant chamber in which is disposed the bearing shoes, means for supplying lubricant under pressure to said chamber, said chamber forming rings providing outlet orifices from the bearing to permit a continuous flow of lubricant through said chamber, said lubricant supplying means comprising a lubricant well formed in the housing from which the bearing chamber is supplied by lubricant, said well providing a pressure head for the lubricant, means for delivering lubricant to the well, means associated with the well for eliminating air bubbles from the lubricant to insure the supply of only homogeneous lubricant to the lubricant chamber, said means including a screen box mounted in the lubricant well of the housing and receiving the lubricant input through which the lubricant passes into the well, means associated with the well for trapping a portion of the lubricant, and means for releasing said trapped lubricant and supplying same to the lubricant chamber.

4. A grinding machine structure of the character described, including a housing, a spindle extending through the housing, bearings contained within the housing for engagement with the spindle, the housing having a chambered portion above the bearings longitudinally and transversely divided by ribs providing a plurality of compartments, means for discharging lubricant for the bearings into one of said compartments in quantity sufficient to over-flow the ribs into several compartments, ducts affording communication between certain of these over-flow compartments and the bearings for conducting lubricant thereto, and means for displacing lubricant in other of the compartments over the separating ribs into the duct compartments for effecting additional lubricant flow therethrough.

5. A structure of the character described, including a housing having spaced bearings, a spindle having portions interfitting with the bearings, a lubricant receiving chamber formed in the housing in over-lying relation to the spindle and having partition members dividing the same into a plurality of compartments, means for discharging lubricant into a central compartment in quantity sufficient to over-flow therefrom into adjacent compartments, certain of said adjacent compartments being formed with passages extending to the respective bearings, displacement members suspended from a wall of the lubricant chamber in over-lying relation to certain of the other compartments, and means for actuating said displacement members to effect an over-flow of oil from their compartments into the compartments in communication with the bearings whereby additional lubricant may be supplied thereby to the bearings.

6. A structure of the character described, including a housing having spaced bearings, a spindle having portions interfitting with the bearings, a lubricant receiving chamber formed in the housing in over-lying relation to the spindle and having partition members dividing the same into a plurality of compartments, means for discharging lubricant into a central compartment in quantity sufficient to over-flow therefrom into adjacent compartments, certain of said adjacent compartments being formed with passages extending to the respective bearings, displacement members suspended from a wall of the lubricant chamber in over-lying relation to certain of the other compartments, means for actuating said displacement members to effect an overflow of oil from their compartments into the compartments in communication with the bearings whereby additional lubricant may be supplied thereby to the bearings, and a screening member disposed within the initial lubricant receiving chamber whereby all oil passing therethrough into any of the compartments will have intrained air removed therefrom.

7. A structure of the character described, including a housing having spaced bearings, a spindle having portions interfitting with the bearings, a lubricant receiving chamber formed in the housing in over-lying relation to the spindle and having partition members dividing the same into a plurality of compartments, means for discharging lubricant into a central compartment in quantity sufficient to overflow therefrom into adjacent compartments, certain of said adjacent compartments being formed with passages extending to the respective bearings, displacement members suspended from a wall of the lubricant chamber in overlying relation to certain of the other compartments, means for actuating said displacement members to effect an over-flow of oil from their compartments into the compartments in communication with the bearings whereby additional lubricant may be supplied thereby to the bearings, a screening member disposed within the initial lubricant receiving chamber whereby all oil passing therethrough into any of the compartments will have intrained air removed therefrom, and an actuator for the displacement units having associated vents for relief of said released air.

8. In apparatus of the general nature of that herein described, in combination, means comprising a chamber having a body of oil confined therein, a rotatable member having a bearing surface in said chamber submerged in said oil, a plurality of bearing shoes circumferentially disposed along and operatively related to said surface, means mounting each shoe for rocking movement in a plane transverse to the axis of said rotatable member, said shoes being formed and mounted to tilt automatically to an extent to balance the effect of variations in load on said rotatable member and said first means being formed and adapted to exert a substantial pressure within said body of oil entirely about said bearing surface and thereby stabilize conditions within said oil, and means permitting a throttled escape of oil adjacent the end of the bearing.

9. In apparatus of the general nature of that herein described, in combination, means comprising a chamber having a body of oil therein, a rotatable member having a bearing surface in said chamber submerged in said oil, a plurality of bearing shoes circumferentially disposed entirely about and operatively related to said surface, means mounting each shoe for rocking movement in a plane transverse to the axis of said rotatable member, said shoes being formed and mounted to tilt automatically to an extent to balance the effect of variations in load on said rotatable member and said first means being formed and adapted to exert a pressure within said body of oil entirely about said bearing surface equal to a hydrostatic head not substantially less than the diameter of said rotatable member and thereby stabilize conditions within said oil.

10. In apparatus of the general nature of that herein described, in combination, means comprising a chamber having a body of oil therein, a rotatable member having a bearing surface in said chamber submerged in said oil, a plurality of bearing shoes circumferentially disposed entirely about and operatively related to said surface, means mounting each shoe for rocking movement in a plane transverse to the axis of said rotatable member, said shoes being formed and mounted to tilt automatically to an extent to balance the effect of variations in load on said rotatable member and said body of oil being of sufficient height to provide a hydrostatic head above the top of said bearing surface at least equal to the diameter of said rotatable member and thereby stabilize conditions within said oil, and means adapted to adjust the pivot of one or more of said shoes toward and away from said bearing surface and hold the same and permit swinging of the corresponding shoe about the same in adjusted position.

ALBERT H. DALL.
HANS ERNST

CERTIFICATE OF CORRECTION.

Patent No. 2,160,777.    May 30, 1939.

ALBERT H. DALL, ET AL.

It is hereby certified that error appears in the printed specification of the above numbered patent requiring correction as follows: Page 2, first column, line 30, for the word "regulated" read regulating; and that the said Letters Patent should be read with this correction therein that the same may conform to the record of the case in the Patent Office.

Signed and sealed this 4th day of July, A. D. 1939.

Henry Van Arsdale (Seal)            Acting Commissioner of Patents.

chamber in over-lying relation to certain of the other compartments, and means for actuating said displacement members to effect an over-flow of oil from their compartments into the compartments in communication with the bearings whereby additional lubricant may be supplied thereby to the bearings.

6. A structure of the character described, including a housing having spaced bearings, a spindle having portions interfitting with the bearings, a lubricant receiving chamber formed in the housing in over-lying relation to the spindle and having partition members dividing the same into a plurality of compartments, means for discharging lubricant into a central compartment in quantity sufficient to over-flow therefrom into adjacent compartments, certain of said adjacent compartments being formed with passages extending to the respective bearings, displacement members suspended from a wall of the lubricant chamber in over-lying relation to certain of the other compartments, means for actuating said displacement members to effect an overflow of oil from their compartments into the compartments in communication with the bearings whereby additional lubricant may be supplied thereby to the bearings, and a screening member disposed within the initial lubricant receiving chamber whereby all oil passing therethrough into any of the compartments will have intrained air removed therefrom.

7. A structure of the character described, including a housing having spaced bearings, a spindle having portions interfitting with the bearings, a lubricant receiving chamber formed in the housing in over-lying relation to the spindle and having partition members dividing the same into a plurality of compartments, means for discharging lubricant into a central compartment in quantity sufficient to overflow therefrom into adjacent compartments, certain of said adjacent compartments being formed with passages extending to the respective bearings, displacement members suspended from a wall of the lubricant chamber in overlying relation to certain of the other compartments, means for actuating said displacement members to effect an over-flow of oil from their compartments into the compartments in communication with the bearings whereby additional lubricant may be supplied thereby to the bearings, a screening member disposed within the initial lubricant receiving chamber whereby all oil passing therethrough into any of the compartments will have intrained air removed therefrom, and an actuator for the displacement units having associated vents for relief of said released air.

8. In apparatus of the general nature of that herein described, in combination, means comprising a chamber having a body of oil confined therein, a rotatable member having a bearing surface in said chamber submerged in said oil, a plurality of bearing shoes circumferentially disposed along and operatively related to said surface, means mounting each shoe for rocking movement in a plane transverse to the axis of said rotatable member, said shoes being formed and mounted to tilt automatically to an extent to balance the effect of variations in load on said rotatable member and said first means being formed and adapted to exert a substantial pressure within said body of oil entirely about said bearing surface and thereby stabilize conditions within said oil, and means permitting a throttled escape of oil adjacent the end of the bearing.

9. In apparatus of the general nature of that herein described, in combination, means comprising a chamber having a body of oil therein, a rotatable member having a bearing surface in said chamber submerged in said oil, a plurality of bearing shoes circumferentially disposed entirely about and operatively related to said surface, means mounting each shoe for rocking movement in a plane transverse to the axis of said rotatable member, said shoes being formed and mounted to tilt automatically to an extent to balance the effect of variations in load on said rotatable member and said first means being formed and adapted to exert a pressure within said body of oil entirely about said bearing surface equal to a hydrostatic head not substantially less than the diameter of said rotatable member and thereby stabilize conditions within said oil.

10. In apparatus of the general nature of that herein described, in combination, means comprising a chamber having a body of oil therein, a rotatable member having a bearing surface in said chamber submerged in said oil, a plurality of bearing shoes circumferentially disposed entirely about and operatively related to said surface, means mounting each shoe for rocking movement in a plane transverse to the axis of said rotatable member, said shoes being formed and mounted to tilt automatically to an extent to balance the effect of variations in load on said rotatable member and said body of oil being of sufficient height to provide a hydrostatic head above the top of said bearing surface at least equal to the diameter of said rotatable member and thereby stabilize conditions within said oil, and means adapted to adjust the pivot of one or more of said shoes toward and away from said bearing surface and hold the same and permit swinging of the corresponding shoe about the same in adjusted position.

ALBERT H. DALL.
HANS ERNST

CERTIFICATE OF CORRECTION.

Patent No. 2,160,777.   May 30, 1939.

ALBERT H. DALL, ET AL.

It is hereby certified that error appears in the printed specification of the above numbered patent requiring correction as follows: Page 2, first column, line 30, for the word "regulated" read regulating; and that the said Letters Patent should be read with this correction therein that the same may conform to the record of the case in the Patent Office.

Signed and sealed this 4th day of July, A. D. 1939.

Henry Van Arsdale (Seal)   Acting Commissioner of Patents.